United States Patent [19]
Morgan

[11] 3,804,114
[45] Apr. 16, 1974

[54] CHECK VALVE

[75] Inventor: Edward J. Morgan, Fond Du Lac, Wis.

[73] Assignee: Brunswick Corporation, Chicago, Ill.

[22] Filed: Feb. 28, 1972

[21] Appl. No.: 229,736

[52] U.S. Cl...... 137/515.5, 137/516.13, 137/543.21
[51] Int. Cl............................................. F16k 15/02
[58] Field of Search...... 128/218 C; 137/515, 515.3, 137/515.5, 515.7, 516.11, 516.13, 543.19, 543.21

[56] References Cited
UNITED STATES PATENTS

| | | | |
|---|---|---|---|
| 1,525,861 | 2/1925 | Franklin | 137/543.19 X |
| 2,103,427 | 12/1937 | Long | 137/515.5 |
| 2,129,963 | 9/1938 | Rayfield | 137/540 X |
| 2,223,994 | 12/1940 | Johnson | 137/543.21 |
| 2,430,427 | 11/1947 | Katcher | 137/543.21 |
| 2,585,773 | 2/1952 | Hartman | 137/543.21 |
| 2,935,082 | 5/1960 | Richardson et al. | 137/543.19 X |
| 3,203,455 | 8/1965 | Horabin | 128/218 C X |
| 3,417,904 | 12/1968 | McLay | 128/218 C X |

FOREIGN PATENTS OR APPLICATIONS

| | | | |
|---|---|---|---|
| 386,966 | 12/1923 | Germany | 137/543.19 |
| 1,947,093 | 3/1970 | Germany | 137/543.21 |

*Primary Examiner*—William R. Cline
*Attorney, Agent, or Firm*—Roy T. Montgomery; William G. Lawler, Jr.

[57] ABSTRACT

A low inertia, rapid response, low volume check valve utilizes two body members positioned in end-to-end alignment. The valve bodies have end faces which are clamped into sealing engagement with each other. A shallow cylindrical chamber is formed in one of the end faces and carries a very thin, disc like valve closure member which floats between a closed position against the face of the inlet body and an open position against the face of the outlet body. The closure member is relieved to permit fluid flow therearound and into depressions in the face of the outlet body. Preferably the outlet passage is formed by stainless steel tubing such as hypodermic tubing carried in the outlet body to provide an inexpensive outlet passage with a minimum of contained volume.

6 Claims, 5 Drawing Figures

PATENTED APR 16 1974  3,804,114

CHECK VALVE

BACKGROUND OF THE INVENTION

This invention relates to improvements in high-speed, low inertia check valves particularly useful in fuel systems for internal combustion engines.

Check valves are used to limit fluid flow through a conduit to one direction. Normally the pressure of the fluid in the forward direction opens the check valve. The valve would be biased to a normally closed position such that unless the forward pressure sufficiently exceeds the back pressure the valve will remain closed preventing back flow of fluid.

It has been found that there are no commercially available high-speed check valves with low opening pressure and low internal volume. Such a valve is needed for use in the internal combustion engine shown in my co-pending application, Ser. No. 229,738. Such engines have been operated at speeds of 7,000 revolutions per minute and so require very high-speed check valves.

SUMMARY OF THE INVENTION

The present invention provides a valve closure member with relieved portions to allow fluid flow therearound. The thin disc is relatively light and, therefore, responds quickly. The closure member is carried in a shallow cylindrical recess. One end of the recess is preferably formed by a flat face of an inlet body. The other end is formed by the end face in an outlet body. Openings in the face of the outlet body and the relieved portions of the closure member assure flow around the closure member when the valve is open. The face of the outlet body provides a positive stop to ensure that the closure member motion is precisely limited to a predetermined limit that may be accurately and easily reproduced from one valve to another. By limiting the distance the closure member moves, the time required for return is kept to a minimum, and so reverse flow is minimized or eliminated. It is, therefore, an object of the present invention to provide a check valve of low opening pressure which inherently has quick response to pressure changes.

In the internal combustion engine of my co-pending application, it is also desirable to have a minimum volume of contained fuel downstream of the closure member, and to have a small diameter outlet passage so as to minimize fluid loss from the valve when closed. It has been found that substantial savings result from drilling a relatively large outlet passage hole, inserting small diameter standard stainless steel tubing such as capillary or hypodermic tubing in the passage and silver soldering the outlet end in place. It is, therefore, an object of this invention to provide an inexpensive check valve with small internal volume and an outlet passage of small diameter.

These and other objects and advantages of the present invention will be more fully appreciated from a consideration of the following specification, particularly when viewed in the light of the drawings.

DRAWINGS

DESCRIPTION OF THE PREFERRED EMBODIMENT

Figure 1:
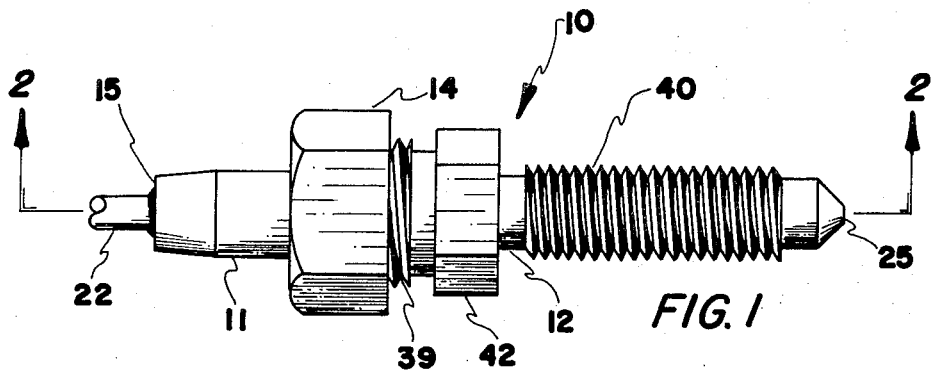
FIG. 1 is an enlarged side elevational view of the check valve of this invention.
Figure 2:
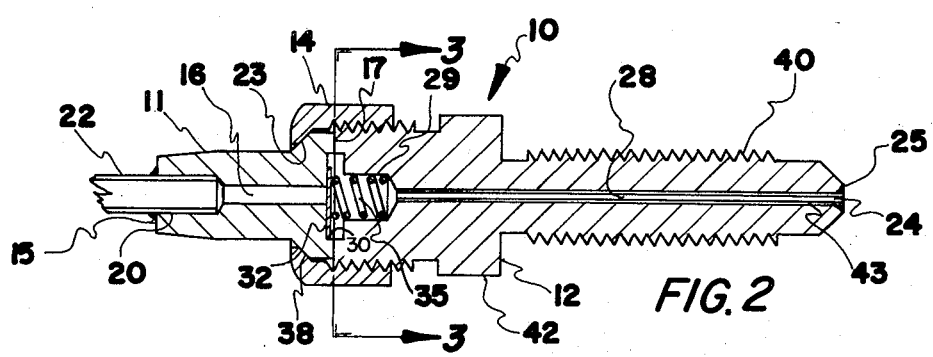
FIG. 2 is a sectional view taken along line 2—2 of FIG. 1.
Figure 4:
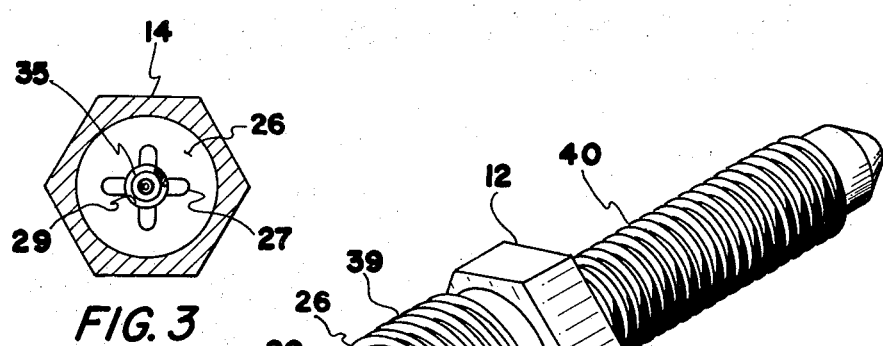
FIG. 4 is an exploded perspective view of the parts of the check valve of this invention.
Figure 4:
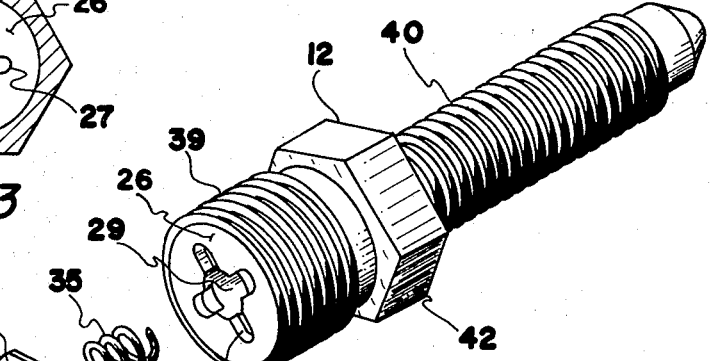
Figure 3:
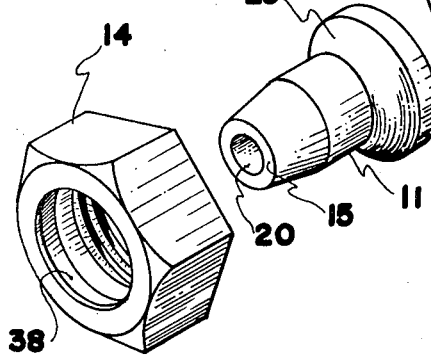
FIG. 3 is a sectional view taken along line 3—3 of FIG. 2.
Figure 5:
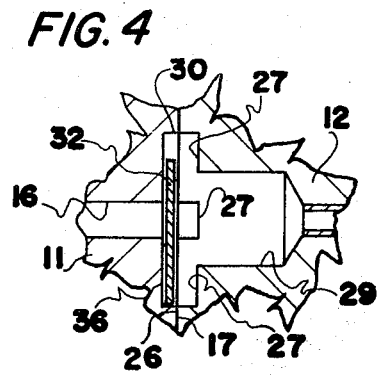
FIG. 5 is an enlarged partial view of the disc and recess area of FIG. 2 with the spring 35 removed.

The check valve 10 of the present invention includes, as its primary components, an inlet or first body member 11, an outlet or second body member 12, and a clamp member 14.

The inlet body member 11 includes an inlet end 15 and a first face 17. An inlet passage 16 extends from the inlet end 15 longitudinally through the member 11 to a recess 30 at the opposite or face end 17 of the inlet member 11. The inlet passage 16 includes an enlarged portion 20 extending therein from the first end 15 in which a fluid supply tube 22 is fixed. A truncated conical portion 23 is provided on the outside of the inlet body member 11 in close proximity to the end face 17 to provide a bearing surface for the clamp member 14.

The outlet body member 12 includes a fluid outlet 24 at one end and a second end face 26 at the other end. An outlet passage 28 extends longitudinally through the outlet body member 12 from the fluid outlet 24 to the end face 26. Both end faces 17 and 26 are machined to provide circumferential sealing surfaces when clamped against each other. The outlet passage 28 includes an enlarged opening 29 extending therein from the end face 26. A number of slots or depressions 27, preferably four (4), extend radially from the enlarged opening 29 of the outlet passage 28. A circular recess 30 is provided in the end face 17. A thin disc shaped valve closure member 32 is carried freely in the recess 30. For ease of assembly, the recess 30 is preferably in the end face 17 as shown so that on assembly the spring 35 holds the closure member 32 within the recess 30. The valve closure member 32 includes peripheral guide surfaces 33 for guiding the member 32 within the recess 30 and relieved portions 34 between the guide surfaces 33 so that fluid may flow around the closure member 32. The most convenient relationship is to make the number of relieved portions 34 differ from the number of depressions 27 by one. As shown in the drawing, the closure member 32 is shaped as a triangle (the three relieved portions 34 formed by the three sides) with rounded corners and with four (4) depressions 27 being provided.

The recess 30 has a flat bottom 36 to assure sealing thereagainst by the valve closure member 32.

A spring 35 or biasing means if provided to bias the valve closure member 32 against the bottom 36 of the recess 30. Therefore, the valve closure member 32 is free to move from a closed position against the bottom 36 of the recess 30 to open position against the second end face 26 of the body member 12.

The clamp member 14 is threaded internally and includes a generally truncated conical portion 38 at one end. The valve 10 is assembled by threading the clamp member 14 onto a threaded portion 39 of the outlet body 12 which draws the inlet body 11 into sealing engagement therewith by the complimentary action of the truncated conical portions 23 and 38. A second threaded portion 40 and a hexagonal nut portion 42 is provided on the outlet body member 12 for ease of installations into an internal combustion engine. However, for some applications, a tube could be silver soldered into the body 12, just as the tube 22 is silver soldered into the body 11.

It has proven to be substantially difficult to drill a small outlet passage 28 of any substantial length in the outlet body member 12. This difficulty has been overcome by drilling a substantially larger hole through the outlet body member 12 and inserting small diameter, thick walled tubing such as stock stainless steel hypodermic or capillary tubing 43 therein. The tubing is then silver soldered at the one end of the outlet body member 12. Thus, a very small fuel outlet passage 28 is provided at minimal expense.

The radially extending depressions or slots 27 normally extend to the periphery of the recess 30 to ensure continuous flow when the check valve 10 is open.

In operation, fluid is supplied through the inlet tube 22 into the inlet passage 16. When the pressure in the inlet passage 16 is sufficiently greater than that in the outlet passage 28 to overcome the force of the spring 35, the valve member 32 will move away from the bottom 36 but will be limited by the end face 26. Fluid will then flow around the periphery of the valve closure member 32 through the openings 27 into the enlarged opening 29 of the outlet passage 28 and through the tubing 43 and out the fluid outlet 25 in the one end of the outlet body member 12. Since the closure member 32 moves a very small distance when opening against the positive stop provided by the second end face 26, and since the closure member 32 may be made very thin, a minimal length of time is required for return to the closed position, and this provides a very rapid response check valve 10. Preferably, the depth of the recess 30 should not be more than approximately the thickness of the valve closure member 32 plus ¼ the diameter of the inlet passage 16, since greater depths will have little effect on the flow capacity of the valve, but the closure time of the valve will be increased unnecessarily. In order to obtain consistent high speed operation of a valve, it is necessary to accurately limit the maximum opening of the closure member. With the construction herein described, the maximum opening of the closure member is the depth of the recess 30 minus the thickness of the closure member 32. The thickness of the closure member may be held within very close tolerances, and the depth of the recess 30 is then the only machined dimension that must be accurately maintained. The depth of the recess 30 may be accurately machined with relative ease, and measurement of the depth is easy. Thus the invention simplifies and enables inexpensive manufacture of check valves for consistent high speed operation. By way of specific example, a check valve has been made in which the thickness of the closure member 32 is 0.008 inches, the diameter of the inlet passage 16 is 0.0625 inches, and the depth of the recess 30 is 0.024 inches. This valve has been operated as the injection valve on a compression ignition engine at speeds of 7,000 revolutions per minute. For extremely high speed operation of the check valve, it may be desirable to increase the diameter of the inlet passage 16 and make the depth of the recess 30 much less than the thickness of the valve closure member 32 plus ¼ the diameter of the inlet passage 16.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A high speed check valve comprising a housing including
   a first body having a fluid inlet, a first end face, and an inlet passage therebetween; said first end face having a recess therein for receiving a valve closing disc and said recess having a flat bottom comprising a valve seal for said disc, said recess having a depth of less than one-quarter of the diameter of the inlet passage plus the thickness of the closure member,
   a second body having a fluid outlet, a second end face, and a fluid outlet passage therebetween, said second end face being in sealing engagement with said first end face so as to retain said disc within said recess, and having a plurality of slots therein extending radially outwardly from said fluid outlet passage providing flow communication between said recess and said fluid outlet passage around said valve closing disc,
   a disc shaped valve closure member retained in said recess such that said closure member may move from a closed position against the flat bottom of said recess to an open position against said second end face;
   means for biasing said disc into sealing engagement against the bottom of said recess, and means for retaining said first and second end faces in sealing engagement.

2. The valve of claim 1, wherein said recess is circular and in alignment with said inlet passage.

3. The valve of claim 2, wherein said closure member is shaped with a number of relieved portions which is different than the number of slots.

4. The valve of claim 2, wherein the slots in said second face extend radially a distance substantially equal to the radius of said circular recess.

5. The valve of claim 1, wherein said valve closure member includes a number of bearing surfaces with relieved portions therebetween.

6. The valve of claim 1, wherein said outlet passage includes an enlarged opening extending inwardly from said second end face and wherein said opening supports said means for biasing said closure member toward the closed position.

* * * * *